March 2, 1954  G. M. WALLER  2,670,997
TREAD BLOCK FOR ENDLESS TREADS
Filed May 1, 1952  2 Sheets-Sheet 1
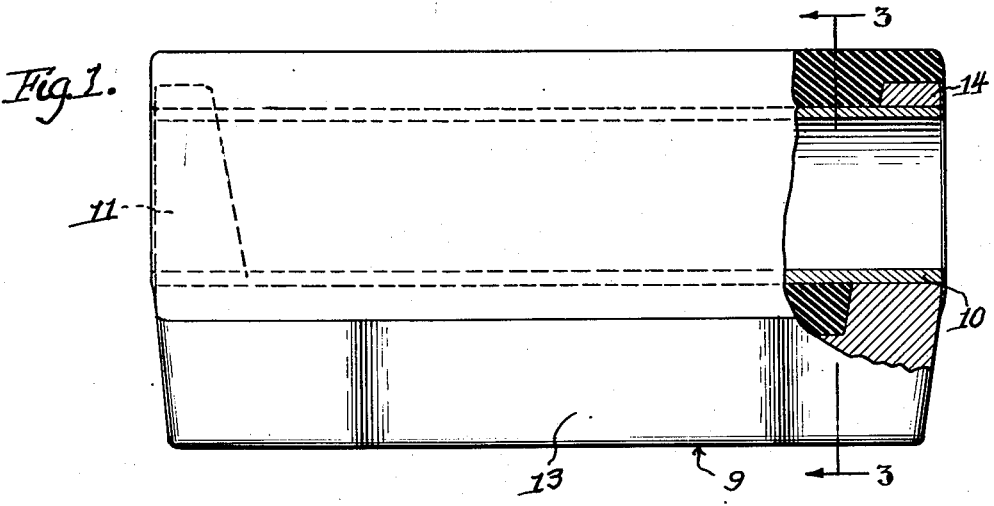
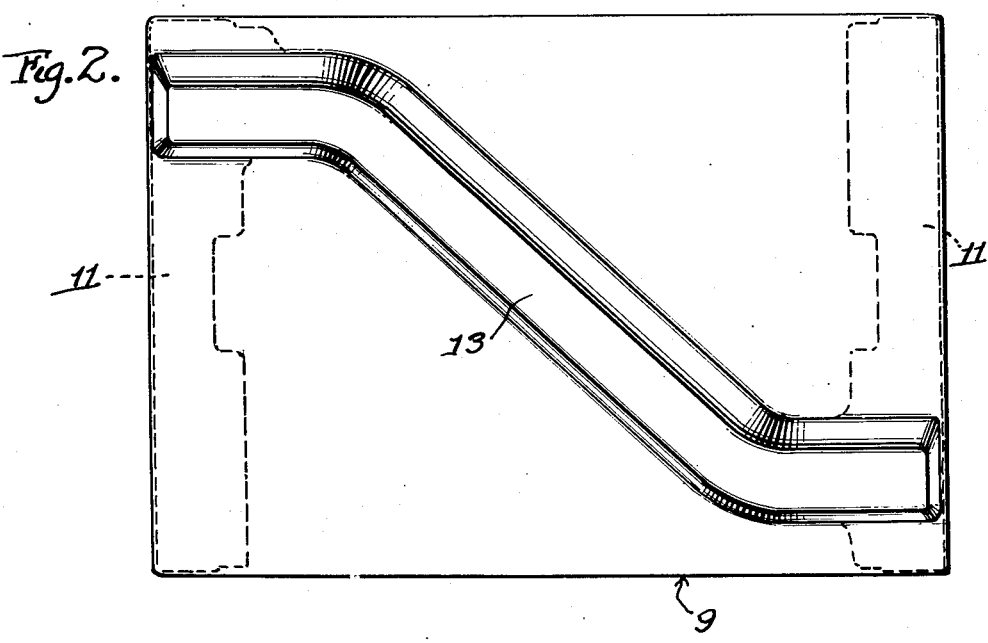
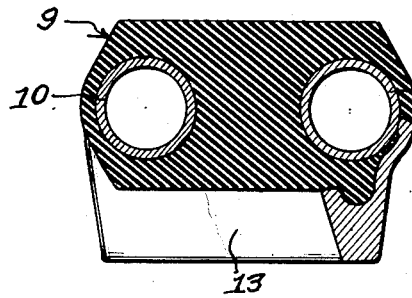
Inventor,
GUSTAV M. WALLER
By: Parker & Carter Attys.

March 2, 1954  G. M. WALLER  2,670,997
TREAD BLOCK FOR ENDLESS TREADS
Filed May 1, 1952  2 Sheets-Sheet 2

Inventor,
GUSTAV M. WALLER
By: Parker & Carter  Attys.

Patented Mar. 2, 1954

2,670,997

UNITED STATES PATENT OFFICE 2,670,997

TREAD BLOCK FOR ENDLESS TREADS

Gustav M. Waller, Geneva, Ill., assignor to Burgess-Norton Mfg. Co., Geneva, Ill., a corporation of Illinois Application May 1, 1952, Serial No. 285,451

4 Claims. (Cl. 305—10)

This invention relates to improvements in tread blocks for endless treads of the kind commonly employed in military vehicles.

The principal object of the invention is to provide a light-weight composite tread unit consisting of a metal frame and molded rubber body.

In carrying out my invention, I provide a tread unit which includes a one-piece metal frame formed of a transverse grouser or cleat connecting the metal end members which support the pivot bearing sleeves, with the remainder of the tread unit formed of molded rubber surrounding the pivot sleeves and exposed to sides, top and bottom of the unit, excepting for the metal grouser or cleat which projects along the bottom of the unit.

Other objects of the invention will appear as the following description proceeds.

The invention may best be understood by reference to the accompanying drawings, in which:

Figure 1 is a side view of a tread unit assembly constructed in accordance with my invention, with parts broken away to show in detail the fixed mounting for the ends of the pivot bearing sleeves;

Figure 2 is a bottom plan view of the unit assembly shown in Figure 1;

Figure 3 is a cross section, in reduced scale, taken on line 3—3 of Figure 1;

Figure 4:
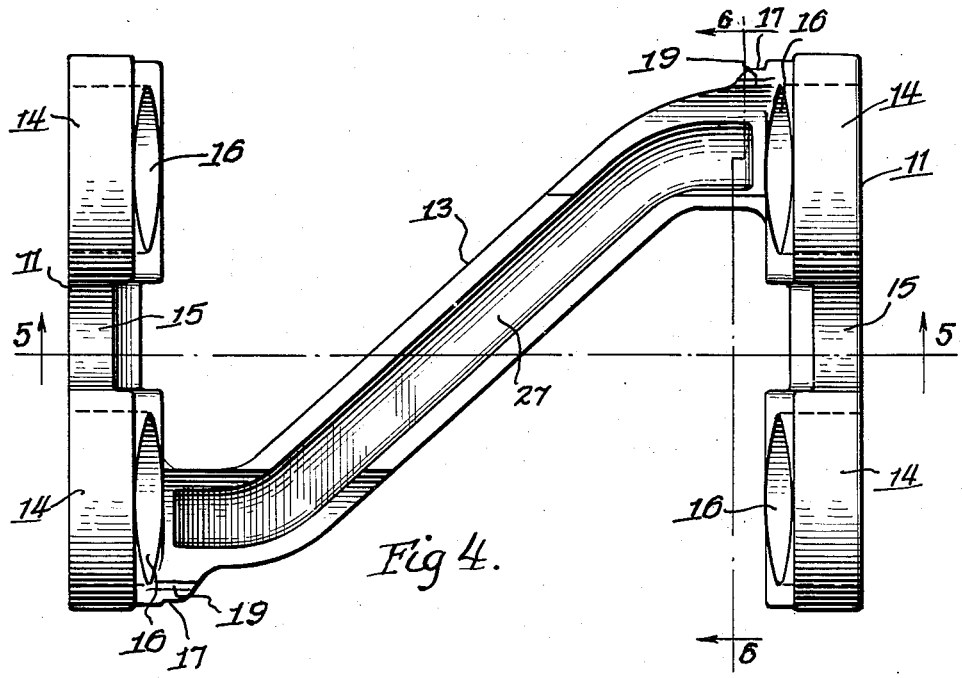
Figure 4 is a top plan view of the metal frame, before the pivot sleeves and rubber body portion are assembled thereon.

Referring now to details of the illustrative embodiment of my invention shown in the drawings, Figures 1, 2 and 3 show a complete assembly of a tread unit 9 of the kind employed in endless track for military tanks and similar vehicles. A plurality of such tread units are pivotally connected together, either in single or double strand, by suitable connecting devices including pivot pins (not shown) which pass through hollow sleeves 10 fixed in parallel relation at opposite ends of a metal frame, indicated generally at 11.

The frame 11 of my invention comprises a generally flat grouser 13 which is offset below and connects opposite pairs of upstanding end supports 14, 14 in which the ends of the pivot sleeves 10 are to be mounted. Each pair of end supports 14, 14 include reduced intermediate webs 15. Apertures 16, 16 are bored through the bearing supports 14 to receive the pivot sleeves 10 which are finally secured therein as by brazing.

The frame 11, with its grouser 13 and bearing supports 14 may be conveniently made as a one-piece die-formed member, as by casting or forging, although the grouser and bearing supports can be made separately, and welded together if desired.

In the form shown, the grouser 13 extends diagonally from below a bearing support 14 at one side of the tread unit to the corresponding position below a bearing support at the opposite side of the tread unit. With this arrangement, the grouser is initially formed with upwardly curved lips 17, 17 along the outer terminal ends thereof where they merge with the extreme ends of their respective sleeve supports. Said lips are thus designed to conform with the adjacent sides of the sleeves 10, 10 in the finished assembly for a relatively short distance at each end of said sleeves. For this purpose, the lips 17, 17 may be machined with arcuate surfaces 19, 19 so as to be fused to the sleeves as by brazing in the final assembly.

Figure 5:
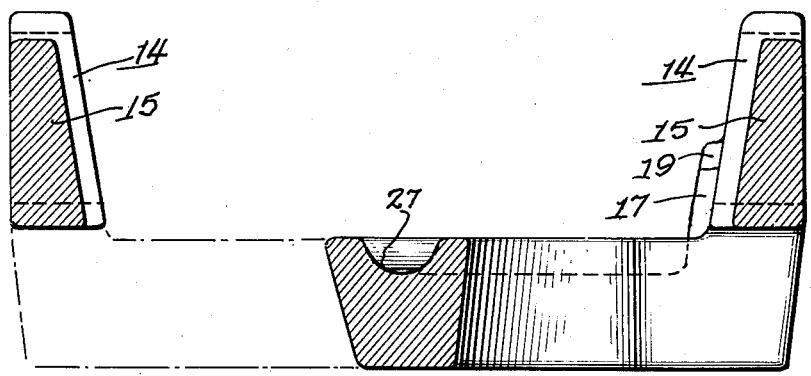
Figure 5 is a longitudinal section of the metal frame, taken on line 5—5 of Figure 4.
Figure 6:
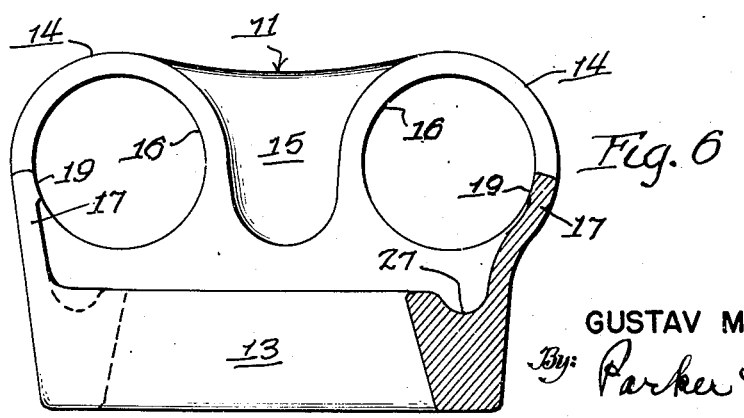
Figure 6 is a transverse section taken on line 6—6 of Figure 4.

The grouser 13 is slightly tapered in cross section, and the upper face of said grouser intermediate its ends is die-formed with an elongated recess 27 of substantial depth, as indicated in Figures 4, 5 and 6.

The end supports 14 and connecting webs 14 are preferably tapered upwardly while the grouser 13 and its recess 27 are also tapered so as to afford ample draft for die-forming the frame as an integral piece.

In assembling the tread unit, the ends of pivot sleeves 10, 10 are fixed in apertures 16, 16 as by welding, and the unit is then completed by placing the metal frame in a suitable mold to form the rubber body 30 substantially enclosing the entire frame, as indicated in Figures 1, 2 and 3. As will be seen from these figures, the rubber body is of conventional block shape, with a flat upper surface 31 adapted to engage the bogie wheels of the vehicle, and with a generally flat under face 32 substantially in the same plane as the upper face of the grouser 13, so as to present a flat rubber tread surface at the bottom of the unit, excepting where the metal grouser projects downwardly therebeyond.

The rubber may also be molded over the outer sides of the pivot bearing end supports 14 in the form of a thin sheet, as indicated at 34, to protect the metal surfaces from corrosion.

By forming the metal frame 11 as described, the finished tread unit can be made economically and yet considerably lighter in weight than comparable tread units of all metal or part metal and rubber construction heretofore used in military tanks and the like, while retaining the advantages of a substantial metal grouser for resisting wear. Thus, the tread unit is made up of a skeletonized frame, so as to contain a minimum amount of metal consistent with normal requirements of strength and durability for tread units of this general class, and resulting in a substantial saving in weight. As is well known, any saving in weight, particularly of moving parts such as an endless tread, is of great importance in vehicles of the character mentioned.

It will be understood of course that the grouser means, herein consisting of a single diagonally extending grouser, may be arranged in other patterns, or a plurality of grousers may be employed on each tread unit, utilizing the same principle of a combined rubber and metal tread surface, as heretofore described.

Although I have shown and described a certain embodiment of my invention, it will be understood that I do not wish to be limited to the exact construction shown and described, but that various changes and modifications may be made without departing from the spirit and scope of the invention as defined in the appended claims.

I claim:

1. A composite metal and rubber tread unit comprising a skeletonized metal frame made up of upstanding end frames connected by transversely extending pivot pin bearing tubes, and with a grouser bar of substantially less width than said tread unit disposed in spaced relation below said tubes and connecting the bottom edges of said end frames together, the main body of said tread unit consisting of a block of molded rubber surrounding said pivot pin tubes above and below the latter, with the bottom face of said rubber block exposed for engagement with the ground but with the metal grouser bar extending transversely of and below the bottom face of said rubber block.

2. A tread unit structure in accordance with claim 1, wherein the upper surface of said grouser bar adjacent the rubber block is hollowed out to reduce the weight of said unit.

3. A tread unit structure in accordance with claim 1, wherein the end frames and grouser bar consist of a single metal piece.

4. A tread unit structure in accordance with claim 1, wherein the grouser bar extends diagonally across the bottom face of the rubber block and connects with the end frames adjacent opposite sides of the tread unit.

GUSTAV M. WALLER.

References Cited in the file of this patent

UNITED STATES PATENTS

| Number | Name | Date |
|---|---|---|
| 2,375,170 | McNeil | May 1, 1945 |
| 2,458,755 | Waller | Jan. 11, 1949 |